United States Patent
Devos et al.

(10) Patent No.: US 10,892,693 B2
(45) Date of Patent: Jan. 12, 2021

(54) METHOD FOR CONTROLLING AN ELECTRIC MOTOR INCLUDING AN IDENTIFICATION SEQUENCE OF A TRANSFORMER

(71) Applicant: Schneider Toshiba Inverter Europe SAS, Pacy sur Eure (FR)

(72) Inventors: Thomas Devos, Carrieres sous Poissy (FR); Al Kassem Jebai, Vernon (FR); Francois Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 16/190,336

(22) Filed: Nov. 14, 2018

(65) Prior Publication Data
US 2019/0190414 A1 Jun. 20, 2019

(30) Foreign Application Priority Data
Dec. 19, 2017 (FR) ..................... 17 62421

(51) Int. Cl.
| | |
|---|---|
| *H02P 6/21* | (2016.01) |
| *H02K 11/00* | (2016.01) |
| *H02P 6/28* | (2016.01) |
| *H02P 6/08* | (2016.01) |
| *H02P 25/024* | (2016.01) |
| *H02P 6/20* | (2016.01) |

(52) U.S. Cl.
CPC ............ *H02P 6/21* (2016.02); *H02K 11/0094* (2013.01); *H02P 6/08* (2013.01); *H02P 6/20* (2013.01); *H02P 6/28* (2016.02); *H02P 25/024* (2016.02)

(58) Field of Classification Search
CPC ...... H02P 1/04; H02P 27/047; H02P 21/0003; H02P 27/08
See application file for complete search history.

(56) References Cited

U.S. PATENT DOCUMENTS 5,909,098 A * 6/1999 Konecny ................. H02P 27/08
318/811
7,468,595 B2 * 12/2008 Lee .......................... H02P 1/04
318/801

(Continued)

FOREIGN PATENT DOCUMENTS

EP 2 963 802 A1 1/2016

OTHER PUBLICATIONS

French Preliminary Search Report dated Sep. 3, 2018 in French Application 17 62421, filed on Dec. 19, 2017 (with English Translation of Categories of Cited Documents & Written Opinion).

*Primary Examiner* — Rina I Duda
(74) *Attorney, Agent, or Firm* — Oblon, McClelland, Maier & Neustadt, L.L.P.

(57) ABSTRACT

A method for controlling an electric motor, implemented in a variable speed drive, the variable speed drive being connected to the electric motor through a transformer, the method including; executing an identification sequence of the transformer for determining gain data corresponding to an inverse function of a transfer function of the transformer; generating a transfer module based on said determined gain data; determining a start-up sequence of the electric motor to be implemented by the variable speed drive by executing the transfer module on a reference current path.

20 Claims, 5 Drawing Sheets

(56) References Cited

U.S. PATENT DOCUMENTS

| | | | |
|---|---|---|---|
| 7,724,549 B2* | 5/2010 | Skibinski | H02M 7/003 363/39 |
| 7,932,693 B2* | 4/2011 | Lee | H02M 7/53875 318/701 |
| 9,054,611 B2* | 6/2015 | Liu | H02P 27/047 |
| 2015/0002059 A1 | 1/2015 | Liu et al. | |
| 2015/0194901 A1* | 7/2015 | Liu | H02P 21/0003 363/37 |
| 2015/0381088 A1 | 12/2015 | Malrait et al. | |

* cited by examiner

METHOD FOR CONTROLLING AN ELECTRIC MOTOR INCLUDING AN IDENTIFICATION SEQUENCE OF A TRANSFORMER

TECHNICAL FIELD OF THE INVENTION

The present invention relates to a method for controlling an electric motor implemented in a variable speed drive. The invention also relates to a system for controlling an electric motor.

PRIOR ART

In some applications, a transformer is present between the output of a variable speed drive and the electric motor controlled by the speed drive. It particularly involves applications for controlling pumps of the ESP type (submersible pump), for which a medium voltage motor is often used. In this case, if the variable speed drive used is low-voltage, a boost transformer is required at the output of the speed drive.

Currently, in a configuration of this type in which the electric motor is an induction motor or is of the permanent magnet synchronous motor type, a specific start-up procedure, such as that disclosed in patent application EP 2963802 A1, involves applying, as input, a predefined current path and a predefined frequency path with a view to allowing engagement of the rotor. This start-up sequence works very well when the inertia of the application controlled by the electric motor is not very high.

In the event of significant inertia, the accelerator torque must be taken into account in the computation of the current reference or of the acceleration ramp time. However, this is not sufficient for ensuring proper start-up. At a low stator frequency, the gain of the transformer is very low and the current at the secondary therefore does not allow sufficient torque to be generated to engage the motor. From a certain stator frequency, the current can become sufficient to start-up the motor, but does not allow the actual speed of the motor to be stabilised. Speed and torque oscillations are then present.

One solution involves increasing the reference current threshold applied at the input, so that the rotor is engaged at a lower speed and so that the current level stabilises the motor. However, in this case, the current applied at the end of the start-up path becomes very high, which can result in damage to the electric motor connected to the secondary of the transformer or to the transformer itself.

In general, ensuring start-up in all conditions (low or high inertia) requires the addition of current sensors on the motor side to control the current at the secondary of the transformer and requires the provision of a specific control solution in the variable speed drive in order to take into account data originating from these sensors.

Patent application US 2015/002059 discloses a solution for controlling an electric motor connected to a variable speed drive through a transformer.

Therefore, the aim of the invention is to propose a method for controlling an electric motor connected to a variable speed drive via a transformer, said method allowing the electric motor to be started-up while creating a minimum amount of speed and torque oscillations, by limiting the level of applied current so as not to damage the electric motor and by avoiding the addition of sensors on the motor side.

DISCLOSURE OF THE INVENTION

This aim is achieved through a method for controlling an electric motor, implemented in a variable speed drive, said variable speed drive being connected to the electric motor through a transformer, which comprises a primary and a secondary, said primary of the transformer being connected to output phases of the variable speed drive and said secondary of the transformer being connected to said electric motor, said method comprising:
- executing an identification sequence of the transformer for determining gain data representing a transfer performed by the transformer;
- generating a transfer module based on said determined gain data;
- determining a start-up sequence of the electric motor to be implemented by the variable speed drive by executing said transfer module on a reference current path.

According to one feature, said identification sequence comprises:
- generating a voltage profile comprising a variable frequency, so as to define a plurality of successive frequency operating points;
- for each frequency operating point, a first acquisition of the current and/or of the voltage at the primary of the transformer and a second acquisition, respectively, of the current and/or of the voltage at the secondary of the transformer;
- determining the gain between the primary and the secondary of the transformer for each frequency operating point.

According to another feature, the voltage profile comprises a fixed amplitude or a variable amplitude, obtained by a current control loop.

According to another feature, the frequency operating points each can be defined by a distinct frequency level of a frequency profile having a plurality of successive levels or each can be defined on a linear frequency variation ramp.

According to another feature, said first acquisition is performed by measuring the current and/or the voltage at the primary of the transformer.

According to another feature, said second acquisition is performed by measuring the current and/or the voltage at the secondary of the transformer.

According to another feature, generating the transfer module involves determining an inverse function of the transfer function of the transformer or creating a table of correspondence.

According to one feature, said identification sequence is executed to also determine phase shift data representing the transfer performed by the transformer.

The invention also relates to a system for controlling an electric motor, said electric motor being controlled by a variable speed drive, said variable speed drive being connected to the electric motor through a transformer, which comprises a primary and a secondary, said primary of the transformer being connected to output phases of the variable speed drive and said secondary of the transformer being connected to said electric motor, said control system comprising a processing and control unit, as well as:
- an identification module of the transformer configured to be executed by the processing and control unit to determine gain data representing a transfer performed by the transformer;
- an analysis module for generating a transfer module on the basis of said determined gain and phase shift data;
- said transfer module being configured to be executed on a reference current path to determine a start-up sequence of the electric motor to be implemented by the variable speed drive.

According to one feature, the identification module comprises a module for generating a voltage profile comprising a variable frequency, so as to define a plurality of successive frequency operating points.

According to another feature, the system comprises a first acquisition module, for each frequency operating point, for acquiring the current and/or the voltage at the primary of the transformer, and a second acquisition module, respectively, for acquiring the current and/or the voltage at the secondary of the transformer.

According to another feature, the analysis module is configured to determine a gain and a phase shift between the primary and the secondary of the transformer for each frequency operating point.

According to another feature, the transfer module comprises an inverse function of said transfer function of the transformer or a table of correspondence.

According to another feature, the identification module is configured to also determine phase shift data representing the transfer performed by the transformer.

BRIEF DESCRIPTION OF THE FIGURES

Further features and advantages will become apparent throughout the following detailed description, which is provided with reference to the accompanying drawings, in which.

DETAILED DESCRIPTION OF AT LEAST ONE EMBODIMENT

Figures 1, 2:
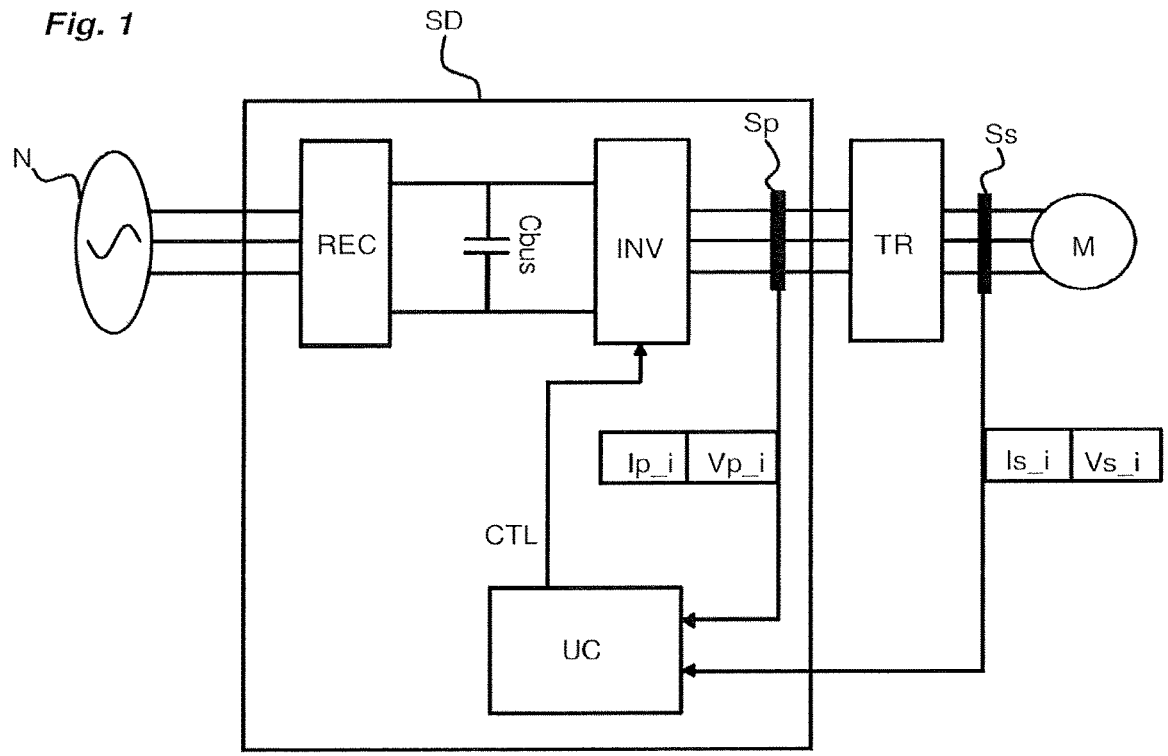
FIG. 1 schematically shows an installation for controlling an electric motor, including the control system of the invention.
FIG. 2 schematically shows the operating principle of the control system of the invention.

The invention is applicable to an installation for controlling an electric motor, which comprises:
- a variable speed drive SD intended to control the electric motor M and particularly comprising an inverter stage INV intended to convert a direct voltage into a variable voltage to be applied to the electric motor M. The variable speed drive 1 shown herein is three-phase;
- a transformer TR connected to the output phases (three phases, reference numerals 1, 2, 3) of the speed drive SD. The transformer TR comprises a primary (index p), to which the output phases of the variable speed drive SD are connected, and a secondary (index 5);
- an electric motor M connected to the secondary of the transformer TR. The electric motor M can be of any type, synchronous or asynchronous, the method of the invention being independent of the type of connected motor.

The variable speed drive SD comprises a processing and control unit UC intended to implement a control law LC for determining, by taking into account, for example, an input speed setpoint, the voltages to be applied to the electric motor M during normal operation of the motor and the control instructions CTL to be applied to the inverter stage INV in order to obtain these output voltages.

The variable speed drive can comprise a rectifier stage REC at the input, which stage is intended to convert an alternating voltage supplied by the electric network N into a direct voltage. It also can comprise a direct power bus connected, on the one hand, to the rectifier stage REC and, on the other hand, to the inverter stage INV. The direct power bus can comprise two power lines connected together by at least one bus capacitor Cbus configured to stabilise the voltage of the bus.

The aim of the invention is to propose a control method for ultimately determining the start-up sequence that is suitable for the installation. To this end, the control method particularly aims to implement an identification sequence of the transformer TR, which is interposed between the variable speed drive SD and the electric motor M, when this transformer TR has been considered to be necessary for implementing the application.

The term identification of the transformer TR is understood to be the determination of the gain and/or of the phase shift generated by the transformer TR between the primary and the secondary of the transformer, as a function of the stator excitation frequency ωst generated by the variable speed drive intended for the electric motor M placed downstream of the transformer TR. Based on the gathered data, it will be possible to determine a transfer function for connecting the stator excitation frequency ωst applied at the input to the currents and voltages present at the primary and at the secondary of the transformer. The resulting transfer function subsequently must be inverted in order to be employed in the start-up sequence. In general, reference can be made to the transfer performed by the transformer between the primary and the secondary, with this transfer being performed by applying a gain and/or a phase shift.

In other words, it involves determining a Bode diagram of the transformer. In a known manner, a Bode diagram is a means of showing the frequency behaviour of a system (in this case the transformer). It can be used to quickly view the gain margin and the phase margin of a system.

The control method is implemented by a suitable control system.

The control system comprises a processing and control unit that comprises at least one microcontroller. This processing and control unit UC can be that of the variable speed drive. The control system can include the variable speed drive.

The identification sequence of the transformer is advantageously implemented outside normal operation of the installation. It can be implemented during a first power-on procedure or during a specific configuration step.

In a known manner, the variable speed drive SD, more specifically its inverter stage, is controlled to apply a three-phase voltage to the three output phases, the frequency and amplitude of which can vary. Conventionally, the control law LC is based on a reference current Iref. Based on the reference current and on the measurements or estimates of the current, the control law LC determines the reference voltage Vref, on the basis of which phase voltages V1_ref, V2_ref, V3_ref are determined that are to be obtained on each output phase. The processing and control unit UC subsequently determines the control instructions to be applied to the transistors of the inverter stage in order to obtain the desired voltages.

The shape of the voltages V1_ref, V2_ref, V3_ref is as follows:

$$V1\_ref = V \sin(2\pi f\ t)$$
$$V2\_ref = V \sin\left(2\pi f\ t - \frac{2\pi}{3}\right)$$
$$V3\_ref = V \sin\left(2\pi f\ t - \frac{4\pi}{3}\right)$$

Throughout the remainder of the description, the principle of the invention will be explained based on the current modules and the voltage modules, respectively resulting from the currents and voltages on the three phases of the installation. However, it is to be understood that the principle can be applied in a similar manner based on the currents and the voltages taken on each phase.

The control system comprises an identification module M1 of the transformer, configured to be executed by the processing and control unit UC with a view to implementing the identification sequence.

The identification module M1 comprises a module M10 for applying a frequency profile, configured to be executed by the processing and control unit UC.

The stator frequency profile comprises a plurality of distinct, successive frequency operating points $\omega st\_i$ that are applied as a function of time. Each frequency operating point is defined by an index i, with i ranging from 1 to n.

During the identification sequence, the amplitude of the voltage determined by the control law LC is, for its part, suitably selected so as not to saturate the transformer, or damage the electric motor. The frequency operating points $\omega st\_i$ advantageously are distinct, but there is no need for them to follow a specific profile. Therefore, it is to be understood that any variation profile of the frequency that allows a plurality of distinct frequency operating points to be defined can be contemplated. By way of an example, two configurations are shown hereafter in FIGS. 6A and 6B.

Figure 6A:
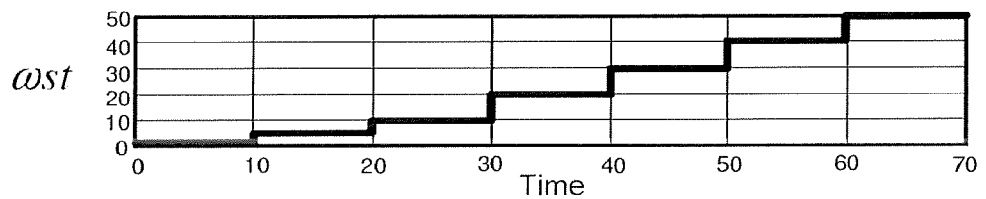
FIGS. 6A and 6B show two examples of profiles followed by the frequency for implementing the identification method of the invention.

A first configuration, shown in FIG. 6A, comprises a plurality of successive levels, each level forming a distinct frequency operating point $\omega st\_i$. The profile can be ascending, as in FIG. 6A, or descending.

Figure 6B:
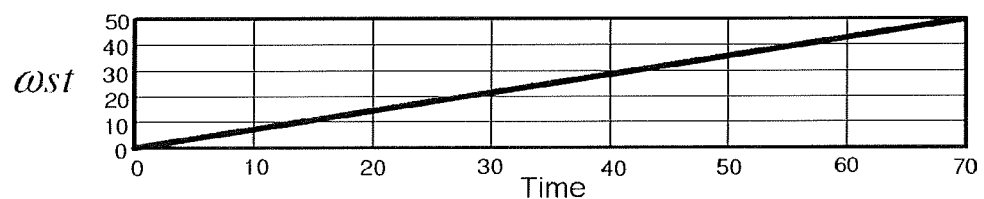

A second configuration, shown in FIG. 6B, comprises a linear ramp. The successive frequency operating points therefore belong to this ramp. The ramp can be ascending, as in FIG. 6B, or descending.

With respect to the control of the output voltage (resulting from the three three-phase voltages) by amplitude V, a plurality of variations can be contemplated.

Figure 3A:
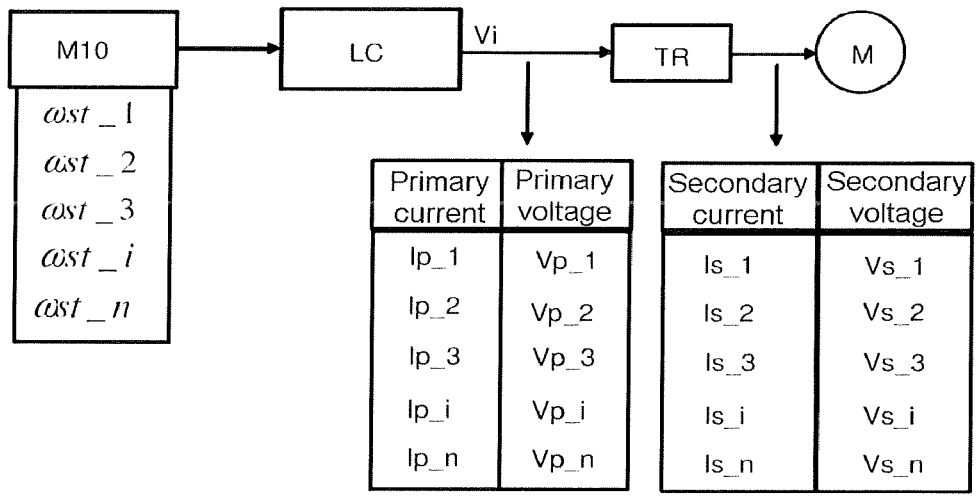
FIG. 3A shows a first identification sequence implemented in the invention.

In a first variation, shown in FIG. 3A, the amplitude Vi of the voltage will remain identical for each frequency operating point i. The scheme therefore simply involves injecting the frequency profile into the control law LC.

Figure 3B:
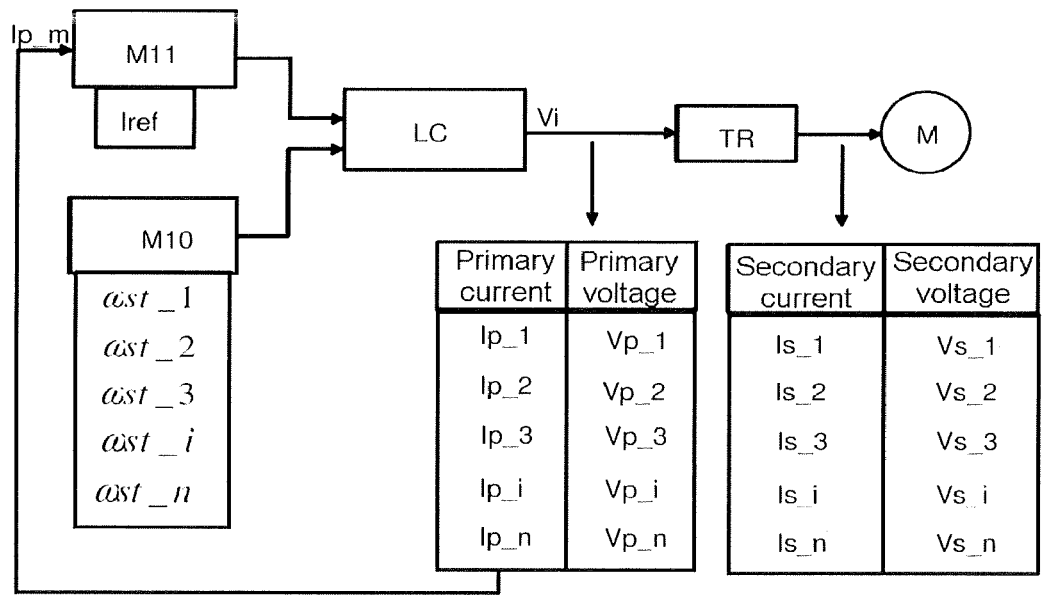
FIG. 3B shows a second identification sequence implemented in the invention.
Figure 3C:
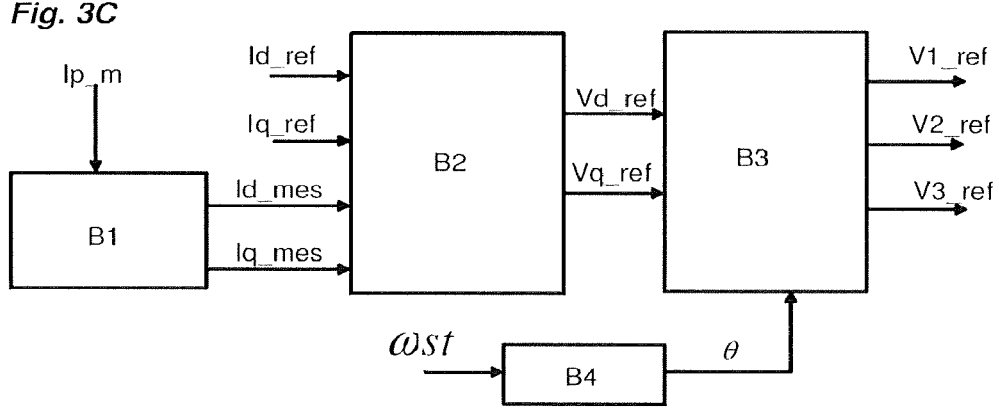
FIG. 3C shows a more specific regulation scheme.

In a second variation, shown in FIG. 3B, by simply considering the module of the voltage, this module can be determined by current regulation. The identification module M1 then comprises an application module M11 for applying a current reference Iref to the control law LC, with this module M11 being executed at the same time as the module M10. The module of the voltage Vi is determined by a proportional integral action controller receiving as input the difference between the reference current Iref and the current Ip_m measured at the primary of the transformer. Within this context, and more specifically, the regulation can follow the scheme as shown in FIG. 3C. In this scheme, the currents measured on the three output phases (Ip_m), connected to the primary of the transformer, are transformed, using a Park transformation, into two currents Id and Iq in the reference point d, q. A proportional integral action controller receives the two measured currents Id, Iq as input, as well as a reference Idref and a reference Iqref. As output, the two reference voltages Vdref and Vqref are obtained. A module applying a Park transformation allows these two reference voltages to be converted into three amplitude voltages Vi to be applied to the three output phases. This module also receives as input a phase shift angle originating from the stator frequency applied according to a defined profile, such as, for example, one of those described hereafter. According to this regulation, the reference Idref can be selected as equal to the current module and the reference Iqref can be selected at a zero value.

The identification sequence subsequently involves acquiring, for each frequency operating point $\omega st\_i$, the current Ip_i and/or the voltage Vp_i at the primary of the transformer and, respectively, the current Is_i and/or the voltage Vs_i at the secondary of the transformer. In other words, when the current Ip_i is acquired at the primary, the current Is_i at the secondary must be acquired. Similarly, when the voltage Vp_i is acquired at the primary, the voltage Vs_i at the secondary must be acquired. The system also can be based both on the currents at the primary and at the secondary and on the voltages at the primary and at the secondary in order to define the transfer function of the transformer TR, but it must be understood that only one of the values (current or voltage) is sufficient. Throughout the remainder of the description, reference will be made to current and/or voltage acquisition and it is to be understood that the acquisition of the current and/or of the voltage at the primary of the transformer necessarily respectively involves the acquisition of the current and/or of the voltage at the secondary.

The control system comprises first means for acquiring the current and/or the voltage at the primary of the transformer and second means for acquiring the current and/or the voltage at the secondary of the transformer.

The first acquisition means can comprise sensors Sp for measuring current and/or voltage placed at the primary of the transformer TR.

The second acquisition means can comprise sensors Ss for measuring current and/or voltage placed at the secondary of the transformer TR.

The first acquisition means can comprise a first acquisition module M20 executed by the processing and control unit UC to acquire the current data Ip_i and/or the voltage data Vp_i measured at the primary of the transformer for each frequency operating point $\omega st\_i$.

The second acquisition means can comprise a second acquisition module M21 executed by the processing and control unit UC to respectively acquire the current data Is_i and/or the voltage data Vs_i measured at the secondary of the transformer TR for each frequency operating point $\omega st\_i$.

The first acquisition module M20 and the second acquisition module M21 are connected to each measurement sensor with a view to recovering the current measurement data and/or the voltage measurement data.

The first acquisition module and the second acquisition module are synchronised so as to make, at each acquisition instant, the current data acquired at the primary coincide with the current data acquired at the secondary of the transformer for each frequency operating point.

The first acquisition module and the second acquisition module are synchronised so as to make the voltage data acquired at the primary coincide in time with the voltage data acquired at the secondary of the transformer for each frequency operating point.

The first acquisition means can be those already employed by the variable speed drive SD for implementing its control law LC of the electric motor.

The second acquisition means can comprise an external electronic card connected to the processing and control unit UC.

The current and/or voltage sensors placed at the secondary of the transformer, as well as the external electronic card, can be employed solely for implementing the identification sequence and can be subsequently removed during the start-up of the electric motor and during the normal operation of the installation.

For each frequency operating point, the identification module M1 launches a step of acquiring current and/or voltage data by executing the first acquisition module M20 and the second acquisition module M21 above.

On completion of the acquisition step, the processing and control unit UC thus has a table of data matching each reference stator frequency value and a current Ip_i and/or voltage Vp_i value to the primary and a current Is_i and/or voltage Vs_i value to the secondary.

Figure 4:
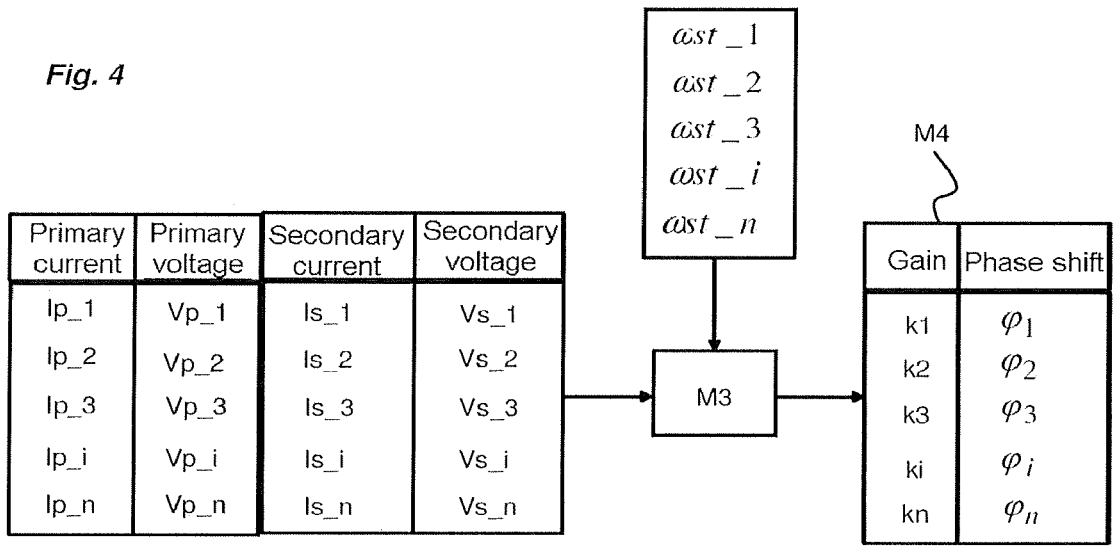
FIG. 4 schematically shows the principle of generating the transfer module used in the control system of the invention.
Figure 5:
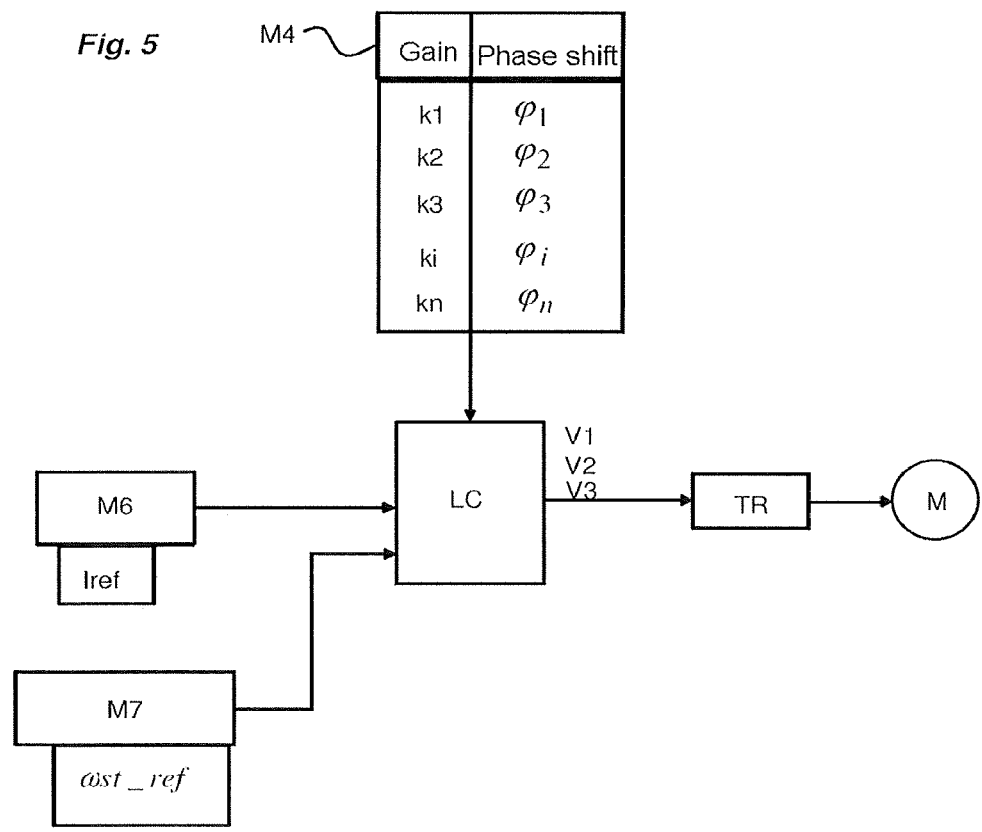
FIG. 5 schematically shows the operating principle of the start-up sequence implemented by the control system of the invention.

Based on this data, the processing and control unit UC executes an analysis module M3 for analysing current and/or voltage data acquired at the primary and at the secondary for each frequency operating point ωst_i, in order to determine, for each frequency operating point, a gain ki and/or a phase shift φi, representing a current and/or voltage transfer performed by the transformer. More specifically, this data represents the inverse of the transfer function (gain and/or phase shift) of the transformer. The data are stored by the processing and control unit UC in its storage means. The principle is shown in appended FIG. 4.

The analysis module M3 is subsequently configured to generate a transfer module M4 intended to be executed by the processing and control unit UC and configured to ensure the transfer of a current and/or of a voltage to be applied to the primary of the transformer to a current and/or a voltage present at the secondary, by taking into account the stator frequency and the gain and/or phase shift values stored on completion of the identification sequence.

This transfer module M4 is employed to generate a specific start-up sequence of the electric motor. The transfer module can be in different forms:
- it can be a table of correspondence between the various data, to which the processing and control unit can refer during the generation of a start-up sequence of an electric motor;
- it can be the inverse function of the transfer of the transformer to be applied during the start-up sequence.

If only the gain of the transformer is considered, the transfer function assumes the form of a transformer function $G(\omega st) = Gain$. The inverse function will thus correspond to $k = 1/G(\omega st)$.

The transfer module M4 can be executed:
- on-line, while running a start-up sequence of the electric motor, with each reference current of the path being corrected by the transfer module; or
- off-line, i.e. prior to a start-up sequence of the electric motor, to fully compute a new start-up sequence that will be stored and employed for every new start-up of the electric motor.

This transfer module M4 allows the reference current path to be generated that is adapted to start-up the electric motor, whilst protecting the electric motor and the transformer.

Figure 7A:
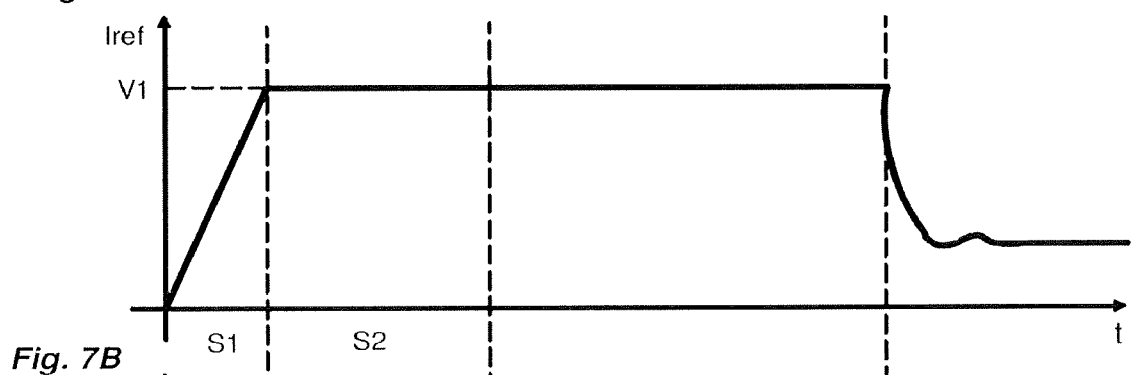
FIGS. 7A and 7B show the principle of a conventional start-up sequence.
Figure 7B:
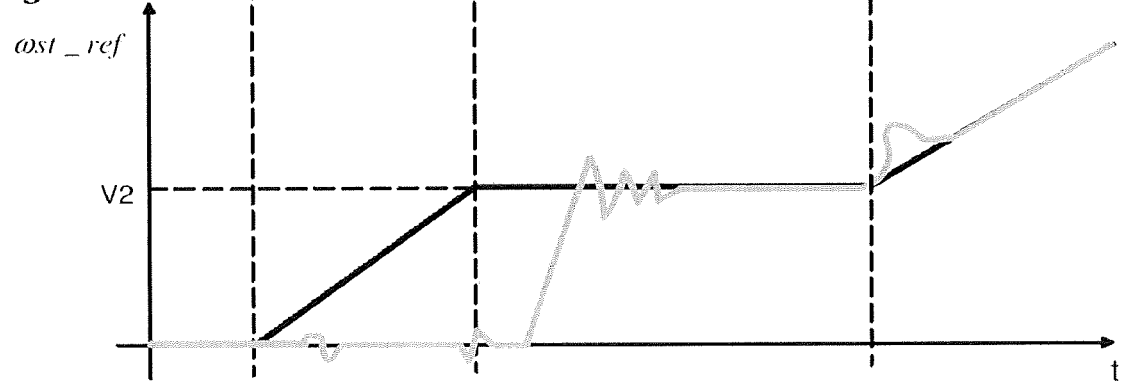

With reference to FIGS. 7A and 7B, a conventional and known start-up sequence of an electric motor, as disclosed in patent application EP 2963802 A1, incorporated herein by way of a reference, comprises the following main steps:

In a first step, the start-up sequence involves determining and applying a reference current Iref (module M6). This reference current Iref is selected at a value greater than a first threshold value, corresponding to the minimum current to be applied to run the synchronous electric motor, i.e. corresponding to the minimum of the load current. FIG. 7A shows the reference current path Iref applied as input. This FIG. 7A, shows a current ramp-up to a value V1 that is selected as greater than said first threshold value (S1). The reference current Iref is subsequently maintained at the value V1 (S2). Preferably, as shown in FIG. 7A, the achieved value V1 is selected as being constant and the current is maintained at this value throughout the start-up sequence.

In a second step, the control unit UC applies a stator frequency path ωst_ref (module M7). The stator frequency ωst_ref is selected at a value that is the lowest possible but is greater than a second threshold value, synonymous with saturation of the transformer, as explained by the previous demonstration. FIG. 7B shows the path of the stator frequency ωst_ref applied as input. In FIG. 7B, the grey curve represents the frequency of the rotor and therefore the actual speed of the electric motor. FIG. 7B shows that the stator frequency ωst_ref is initially selected as zero during the current ramp-up, then it follows a ramp-up once the reference current Iref has reached its constant value. Subsequently, the stator frequency ωst_ref is preferably stabilised at its constant selected value V2. It is stabilised at this value V2 until the end of the start-up sequence.

Since, during the start-up of the motor, the rotor is not aligned, the actual frequency of the rotor does not follow the stator frequency ωst_ref (FIG. 7B). The control unit then maintains control of the current and frequency for a defined time period (a time period that is at least greater than the inverse of the stator frequency), in order to ensure the rotation of the motor (thus to ensure that the motor speed is equal to the reference speed).

Once the rotor is engaged, the control unit knows the frequency of the motor, which is equal to the frequency of the voltage delivered by the variable speed drive, as well as an estimate of the angle θ of the rotor.

The control unit then switches the control of the synchronous electric motor towards the main control law LC.

This conventional start-up sequence is implemented by taking into account a fixed gain for the transformer. The transfer module determined by the aforementioned control method allows this start-up sequence to be corrected, so that it can be adapted to the installation and particularly to the actual gain and/or phase shift characteristics generated by the presence of the transformer.

As previously described, this conventional start-up sequence can prove to be ineffective in the event of significant inertia at the electric motor.

The transfer module M4 determined above therefore allows the sequence to be corrected.

Figure 8A:
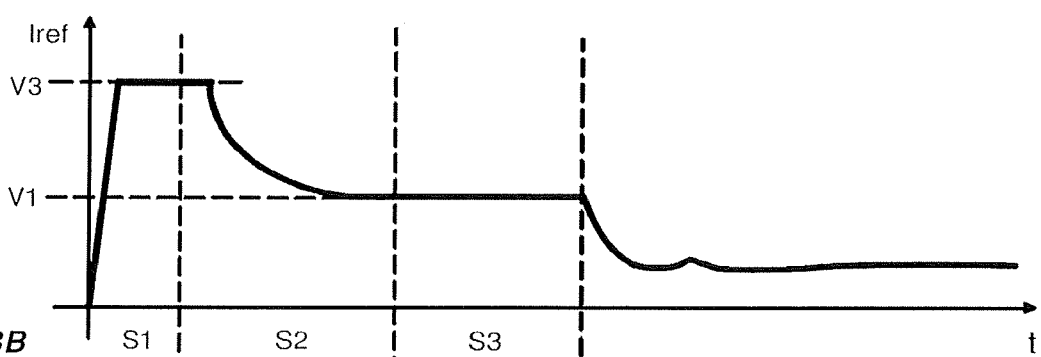
FIGS. 8A and 8B show the principle of a start-up sequence modified by the solution of the invention.
Figure 8B:
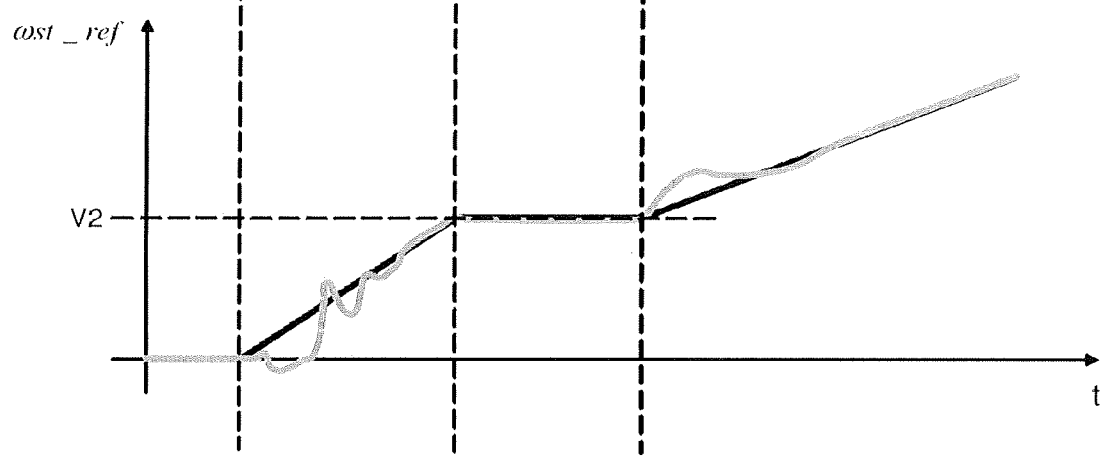

FIGS. 8A and 8B thus show the new start-up sequence of an electric motor obtained after applying the previously determined transfer module M4. These figures show that the reference current Iref follows a different path to the conventional path, which has been modified by the transfer module M4 in order to take into account features of the transformer connected to the output and already identified. In order to determine this new path, the transfer module M4 is configured to:
- receive as input each current value Iref of the conventional current path;
- apply a transfer to each received current Ire by taking into account a gain ki and/or a phase shift (pi;
- generate (on-line or off-line) the new reference current path.

During the application of the new current path, the frequency path remains the same as that of the conventional sequence.

FIG. 8A shows that the current follows a path that comprises a first ramp reaching a value V3 corresponding to the maximum value of the current at the primary, in order to protect the speed drive and the transformer. This value is greater than the previously defined value V1. Therefore, the current remains equal to the value V3, as long as the transfer module M4 generates a current reference that is greater than the value V3. The current subsequently follows a downwards curve to reach the value V1. It then comprises a level at the value V1.

In FIG. 8B, the grey curve represents the frequency of the rotor and therefore the actual speed of the electric motor. It can be seen that the new applied current path ensures that the actual speed tends towards the reference speed.

It is to be understood that the solution of the invention has numerous advantages, including:
- the identification of the features of the transformer allows the start-up sequence to be corrected, thus ensuring the start-up of the electric motor irrespective of the inertia level;
- the identification sequence is simple to implement and is automatic;
- the control method can be adapted to the application connected to the output of the variable speed drive;
- the proposed solution avoids the addition of additional sensors on the motor side when controlling the electric motor, the addition of additional sensors is only necessary during the identification sequence of the transformer.

The invention claimed is:

1. A method for controlling an electric motor, implemented in a variable speed drive, said variable speed drive being connected to the electric motor through a transformer, which comprises a primary and a secondary, said primary of the transformer being connected to output phases of the variable speed drive and said secondary of the transformer being connected to said electric motor, comprising:
- executing an identification sequence of the transformer, during a first power on procedure outside of normal operation, to determine at least gain data representing a transfer performed by the transformer;
- generating a transfer module based on said determined gain data; and
- determining a start-up sequence of the electric motor to be implemented by the variable speed drive by executing said transfer module on a reference current path.

2. The method according to claim 1, wherein said identification sequence comprises:
- generating a voltage profile comprising a variable frequency, so as to define a plurality of successive frequency operating points;
- for each frequency operating point, a first acquisition of the current and/or of the voltage at the primary of the transformer and a second acquisition, respectively, of the current and/or of the voltage at the secondary of the transformer; and
- determining the gain between the primary and the secondary of the transformer for each frequency operating point.

3. The method according to claim 2, wherein the voltage profile comprises a fixed amplitude.

4. The method according to claim 2, wherein the voltage profile comprises a variable amplitude, obtained by a current control loop.

5. The method according to claim 2, wherein the frequency operating points are each defined by a distinct frequency level of a frequency profile having a plurality of successive levels.

6. The method according to claim 2, wherein the frequency operating points are each defined on a linear frequency variation ramp.

7. The method according to claim 2, wherein said first acquisition is performed by measuring the current and/or the voltage at the primary of the transformer.

8. The method according to claim 2, wherein said second acquisition is performed by measuring the current and/or the voltage at the secondary of the transformer.

9. The method according to claim 1, wherein generating the transfer module involves determining an inverse function of a transfer function of the transformer or creating a table of correspondence.

10. The method according to claim 1, wherein said identification sequence is executed to also determine phase shift data representing the transfer performed by the transformer.

11. A system for controlling an electric motor, said electric motor being controlled by a variable speed drive, said variable speed drive being connected to the electric motor through a transformer, which comprises a primary and a secondary, said primary of the transformer being connected to output phases of the variable speed drive and said secondary of the transformer being connected to said electric motor, said system comprising: a processor configured to
- execute an identification sequence, during a first power on procedure outside of normal operation, to determine gain data representing a transfer performed by the transformer;
- generate a transfer module on the basis of said determined gain data;
- said transfer module being configured to be executed on a reference current path to determine a start-up sequence of the electric motor to be implemented by the variable speed drive.

12. The system according to claim 11, wherein the processor is further configured to generate a voltage profile comprising a variable frequency to define a plurality of successive frequency operating points.

13. The system according to claim 12, wherein the processor is further configured to, for each frequency operating point, acquire the current and/or the voltage at the primary of the transformer, and to acquire the current and/or the voltage at the secondary of the transformer.

14. The system according to claim 12, wherein the processor is further configured to determine a gain between the primary and the secondary of the transformer for each frequency operating point.

15. The system according to claim 12, wherein the voltage profile comprises a fixed amplitude.

16. The system according to claim 12, wherein the voltage profile comprises a variable amplitude, obtained by a current control loop.

17. The system according to claim 12, wherein the frequency operating points are each defined by a distinct frequency level of a frequency profile having a plurality of successive levels.

18. The system according to claim 12, wherein the frequency operating points are each defined on a linear frequency variation ramp.

19. The system according to claim 11, wherein the transfer module comprises a transfer function or a table of correspondence.

20. The system according to claim 11, wherein the identification module is configured to also determine phase shift data representing the transfer performed by the transformer.

* * * * *